United States Patent
Liao et al.

(10) Patent No.: US 11,237,662 B2
(45) Date of Patent: Feb. 1, 2022

(54) TOUCH DISPLAY SUBSTRATE WITH SWITCHING DEVICE DISPOSED BETWEEN ADJACENT ELECTRODE BLOCKS, METHOD FOR MANUFACTURING THE SAME, DRIVING METHOD THEREOF, AND DISPLAY DEVICE THEREOF

(71) Applicants: HEFEI BOE OPTOELECTRONICS TECHNOLOGY CO., LTD., Anhui (CN); BOE TECHNOLOGY GROUP CO., LTD., Beijing (CN)

(72) Inventors: Liqing Liao, Beijing (CN); Hongmin Li, Beijing (CN); Zhifu Dong, Beijing (CN)

(73) Assignees: HEFEI BOE OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 444 days.

(21) Appl. No.: 16/328,366

(22) PCT Filed: Jun. 8, 2018

(86) PCT No.: PCT/CN2018/090395
§ 371 (c)(1),
(2) Date: Feb. 26, 2019

(87) PCT Pub. No.: WO2018/228284
PCT Pub. Date: Dec. 20, 2018

(65) Prior Publication Data
US 2021/0278919 A1    Sep. 9, 2021

(30) Foreign Application Priority Data
Jun. 12, 2017 (CN) .......................... 201710436962.5

(51) Int. Cl.
*G06F 3/041* (2006.01)
*G06F 3/044* (2006.01)

(52) U.S. Cl.
CPC .......... *G06F 3/0416* (2013.01); *G06F 3/0412* (2013.01); *G06F 3/0445* (2019.05); *G06F 3/04166* (2019.05); *G06F 2203/04103* (2013.01)

(58) Field of Classification Search
CPC .. G06F 3/0412; G06F 3/04166; G06F 3/0445; G06F 2203/04103
See application file for complete search history.

(56) References Cited

U.S. PATENT DOCUMENTS 9,990,077 B2 * 6/2018 Lu .......................... G06F 3/0443
10,921,918 B2 * 2/2021 Chiang ................. G06F 3/0416
(Continued)

FOREIGN PATENT DOCUMENTS

| CN | 203706191 U | 7/2014 |
| CN | 105094486 A | 11/2015 |

(Continued)

OTHER PUBLICATIONS

PCT International Search Report, Application No. PCT/CN2018/090395, dated Sep. 17, 2018, 5 pages: with English translation.
(Continued)

*Primary Examiner* — Liliana Cerullo
(74) *Attorney, Agent, or Firm* — Armstrong Teasdale LLP

(57) ABSTRACT

Embodiments of the present disclosure provide a touch display substrate, a method for manufacturing the same, a driving method thereof, and a display device thereof. The touch display substrate includes a substrate, a plurality of electrode blocks, independent of each other and arranged in an array, disposed on the substrate, and a switching device disposed between the adjacent electrode blocks. The elec- (Continued)

Fig. 2 trode block is configured to receive a common voltage during a display period and receive a touch scan signal during a touch period. The switching device is configured to electrically connect the adjacent electrode blocks during the display period and electrically isolate the adjacent electrode blocks from each other during the touch period.

18 Claims, 12 Drawing Sheets

(56) References Cited

U.S. PATENT DOCUMENTS

| | | | |
|---|---|---|---|
| 2015/0254491 A1* | 9/2015 | Mo | G06K 9/0002 |
| | | | 345/174 |
| 2016/0202815 A1* | 7/2016 | Zheng | H01L 27/124 |
| | | | 345/174 |
| 2016/0259445 A1* | 9/2016 | Yang | G06F 3/0443 |
| 2016/0291724 A1* | 10/2016 | Li | G06F 3/0412 |
| 2016/0291777 A1* | 10/2016 | Xi | G06F 3/041 |
| 2017/0153752 A1* | 6/2017 | Kurasawa | G02F 1/13338 |
| 2018/0129090 A1* | 5/2018 | Tsai | G02F 1/1333 |

FOREIGN PATENT DOCUMENTS

| | | |
|---|---|---|
| CN | 105786246 A | 7/2016 |
| CN | 107015707 A | 8/2017 |
| KR | 20160066677 A | 6/2016 |

OTHER PUBLICATIONS

PCT Written Opinion, Application No. PCT/CN2018/090395, dated Sep. 17, 2018, 5 pages.: with English translation of relevant part.

\* cited by examiner

A - A

TOUCH DISPLAY SUBSTRATE WITH SWITCHING DEVICE DISPOSED BETWEEN ADJACENT ELECTRODE BLOCKS, METHOD FOR MANUFACTURING THE SAME, DRIVING METHOD THEREOF, AND DISPLAY DEVICE THEREOF

CROSS REFERENCE TO RELATED APPLICATIONS

This patent application is a National Stage Entry of PCT/CN2018/090395 filed on Jun. 8, 2018, which claims the benefit and priority of Chinese Patent Application No. 201710436962.5 filed on Jun. 12, 2017, the disclosures of which are incorporated by reference herein in their entirety as part of the present application.

BACKGROUND

The present disclosure relates to a field of display technologies, and in particular, to a touch display substrate, a method for manufacturing the same, a driving method thereof, and a display device thereof.

With the rapid development of display technology, the touch screen panel has gradually spread throughout people's lives. At present, the touch panel can be classified into an add-on mode, an on-cell mode, an in-cell mode, and the like according to a composition structure.

BRIEF DESCRIPTION

Embodiments of the present disclosure provide a touch display substrate, a method for manufacturing the same, a driving method thereof, and a display device thereof.

An aspect of the present disclosure provides a touch display substrate. The touch display substrate includes a substrate, a plurality of electrode blocks, independent of each other and arranged in an array, disposed on the substrate, and a switching device disposed between the adjacent electrode blocks. The electrode block is configured to receive a common voltage during a display period and receive a touch scan signal during a touch period. The switching device is configured to electrically connect the adjacent electrode blocks during the display period and electrically isolate the adjacent electrode blocks from each other during the touch period.

In an embodiment of the present disclosure, the switching device includes a transistor. The transistor includes a functional signal line, an insulating layer, and an active layer which are sequentially disposed between the substrate and the electrode block. An orthographic projection of the functional signal line on the substrate at least covers an orthographic projection of a gap between the adjacent electrode blocks on the substrate.

In an embodiment of the present disclosure, the electrode block includes a transparent conductive oxide. The transistor further includes a metal layer disposed between the active layer and the electrode block.

In an embodiment of the present disclosure, the metal layer includes a first metal line and a second metal line spaced apart from each other, wherein an orthographic projection of the first metal line on the substrate and an orthographic projection of the second metal line on the substrate respectively partially overlap with orthographic projections of the adjacent electrode blocks on the substrate.

In an embodiment of the present disclosure, the touch display substrate further includes a gate line and a data line disposed in form of intersection, and the functional signal line is disposed in the same layer as the data line.

In an embodiment of the present disclosure, the touch display substrate further includes a touch signal line coupled to the electrode block, and a dummy touch signal line disposed in the same layer as and in parallel with the touch signal line. The functional signal line includes the dummy touch signal line.

An aspect of the present disclosure provides a method for manufacturing the touch display substrate as described above. The method includes providing a substrate, forming a plurality of electrode blocks independently of each other and arranged in an array on the substrate, and forming a switching device between the adjacent electrode blocks on the substrate. The electrode block is configured to receive a common voltage during a display period and receive a touch scan signal during a touch period, the switching device being configured to electrically connect the adjacent electrode blocks during the display period and electrically isolate the adjacent electrode blocks from each other during the touch period.

In an embodiment of the present disclosure, forming the switching device includes sequentially forming a functional signal line, an insulating layer, and an active layer on the substrate. Forming the electrode block includes forming the electrode block on the active layer. An orthographic projection of the functional signal line on the substrate at least covers an orthographic projection of a gap between the adjacent electrode blocks on the substrate.

In an embodiment of the present disclosure, forming the switching device further includes forming a metal layer on the active layer. The metal layer includes a first metal line and a second metal line spaced apart from each other. An orthographic projection of the first metal line on the substrate and an orthographic projection of the second metal line on the substrate respectively partially overlap with orthographic projections of the adjacent electrode blocks on the substrate.

An aspect of the present disclosure provides a touch display device, which includes the touch display substrate as described above.

An aspect of the present disclosure provides a driving method of a touch display substrate. The touch display substrate includes a substrate, a plurality of electrode blocks, independent of each other and arranged in an array, disposed on the substrate, and a switching device disposed between the adjacent electrode blocks. The driving method includes the electrode block receives a touch scan signal during a touch period, and the electrode block receives a common voltage during a display period. The switching device electrically isolates the adjacent electrode blocks from each other during the touch period and electrically connects the adjacent electrode blocks during the display period.

In an embodiment of the present disclosure, the touch display substrate further includes a touch signal line coupled to the electrode block. During the touch period, the touch signal line provides a touch scan signal to the electrode block, and during the display period, the touch signal line provides a common voltage to the electrode block.

In an embodiment of the present disclosure, the touch display substrate further includes a dummy touch signal line disposed in the same layer as and in parallel with the touch signal line. The functional signal line includes the dummy touch signal line. During the touch period, the functional signal line provides a low voltage and the switching device is turned off, and during the display period, the functional signal line provides a high voltage and the switching device is turned on, so as to electrically connect the adjacent electrode blocks.

Of course, implementing any of the products or methods of the present disclosure does not necessarily require all of the advantages described above to be achieved at the same time. Other features and advantages of the present disclosure will be set forth in embodiments of the specification and partially become apparent from embodiments of the specification or be known by implementing the present disclosure. The other advantages of the embodiments of the present disclosure can be realized and obtained by the structure particularly pointed out in the specification, the claims, and the drawings.

BRIEF DESCRIPTION OF THE DRAWINGS

The drawings are used to provide a further understanding of the technical solutions of the present disclosure, constitute a part of the specification, together with the embodiments of the present disclosure are used to explain the technical solutions of the present disclosure, and do not constitute a limitation to the technical solutions of the present disclosure. The shapes and sizes of the various components in the drawings do not reflect true proportions, and are merely intended to illustrate the present disclosure.

Corresponding reference numerals indicate corresponding parts or features throughout the several views of the drawings.

DETAILED DESCRIPTION

Figure 1:
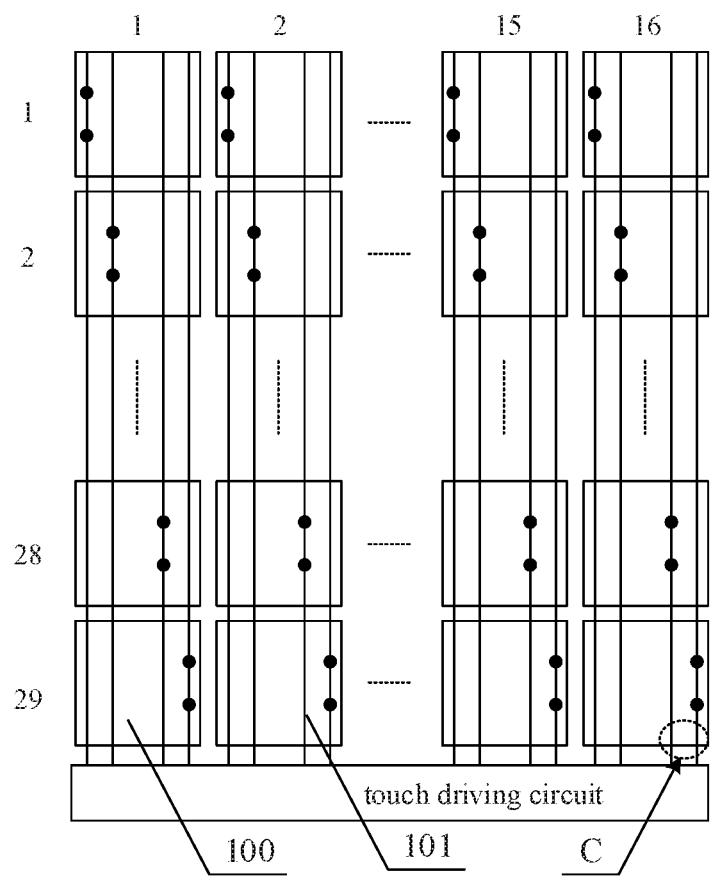
FIG. 1 is a structural schematic view of a self-capacitance mode in-cell touch display device.

In the description of the embodiments of the present disclosure, it is to be understood that the orientation or position indicated by the terms "middle", "upper", "lower", "front", "back", "vertical", "horizontal", "top", "bottom", "inside", "outside" and the like is based on the orientation or position shown in the drawings, and is merely for the convenience of describing the present disclosure and for simplifying the description, rather than indicating or implying that the device or element referred to must have specific orientation and be constructed and operated by the specific orientation, and thus which can not to be considered as a limit to the present disclosure.

In the description of the embodiments of the present disclosure, it should be noted that, except for otherwise being explicitly defined and limited, terms, "installing", "linking", and "connecting" are to be understood broadly, and may be, for example, fixedly connecting or removably connecting, or integrally connecting, may be mechanically connecting or electrically connecting, may be directly connecting or indirectly connecting through an intermediate medium, and may be internally communicating between two elements. The specific meanings of the above terms in the present disclosure can be understood in the specific circumstances by those skilled in the art.

The specific embodiments of the present disclosure are further described in detail below with reference to the accompanying drawings and embodiments. The following embodiments are intended to illustrate the disclosure, but are not intended to limit the scope of the disclosure. It should be noted that, in the case of no conflict, the embodiments and the features in the embodiments in the present application may be arbitrarily combined with each other.

At present, the touch panel can be classified into an add-on mode, an on-cell mode, an in-cell mode, and the like according to a composition structure. The add-on mode touch panel is manufactured by separately preparing a touch module and a display module, and then bonding the touch module and the display module together to form a touch panel with a touch function, which has the disadvantages of high manufacturing cost, low light transmittance, and thick module. Additionally, in the in-cell touch panel, touch electrodes of a touch module are embedded into a display module, which not only greatly reduces the overall thickness of the in-cell touch panel, but also greatly reduces the manufacturing cost, and is favored by the major panel manufacturers.

The existing in-cell touch panel is mainly divided into a mutual capacitance mode structure and a self-capacitance mode structure. Compared with the touch panel using the mutual capacitance principle, the touch panel using the self-capacitance principle can effectively improve the signal-to-noise ratio of touch, thereby improving the accuracy of the touch sensing.

In actual use, inventors of the present disclosure have found that the existing self-capacitance mode in-cell touch display device has disadvantages of large power consumption and low display quality, etc.

Figure 2:
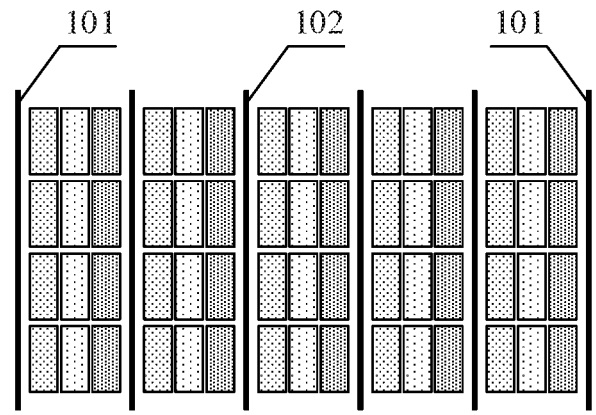
FIG. 2 is an enlarged view of a position C in FIG. 1.

FIG. 1 is a structural schematic view of a self-capacitance mode in-cell touch display device, and FIG. 2 is an enlarged view of a position C in FIG. 1. As shown in FIG. 1, each of rectangular patterns within the touch display device having a size of about 4*4 mm or 5*5 mm is a touch electrode 100. Each touch electrode 100 is connected to a touch driving circuit through a touch signal line 101. When the touch display device is used for touch, the touch of the human's finger changes the self-capacitance of respective touch electrode 100, and the touch driving circuit determines the specific position of the finger according to the change of the capacitance of the touch electrode 100. Generally, the touch display device uses an electrode layer that provides a common voltage as a touch layer. The electrode layer is "divided" to form the touch electrode 100 having a rectangular shape as shown in FIG. 1. One touch electrode 100 covers a plurality of pixels and is controlled by the touch signal line 101. The touch signal line 101 is disposed between adjacent pixels. As shown in FIG. 2, in order to ensure the consistency of the pixel structure, signal lines are disposed between adjacent pixels, but since one touch electrode covers a plurality of pixels, only a few of these signal lines are used as the touch signal lines 101 for controlling the touch electrode 100, and other ones of these signal lines are dummy touch signal lines 102. The dummy touch signal line has no signal input, and only used to make the display effect uniform.

The touch display device shown in FIG. 1 and FIG. 2 adopts a time sharing driving operation mode, i.e., a driving signal of the display period and a driving signal of the touch period are separately processed. During the display period, the data line is supplied with a display signal by a data driving circuit, the touch electrodes are multiplexed into common electrodes, the touch signal lines are multiplexed into common electrode lines, and the touch signal line provides a common voltage to the touch electrode without scanning the touch signal so as to ensure normal display. During the touch period, the touch driving circuit scans the touch signal through the touch signal line. At this time, the display of one frame has been completed, and the display state is basically not affected by the touch signal. The display signal and the touch signal work independently during different time.

According to the study by the inventors of the present disclosure, a self-capacitance in-cell touch display device as shown in FIGS. 1 and 2 has a high requirement for a common voltage supplying capability and a common voltage supplying may be unstable. This is because the touch electrodes of the touch display device are separated from each other, so each touch electrode needs a corresponding touch signal line to provide a common voltage. Due to the influence of the manufacturing quality of the touch signal lines, the transmission characteristics of different touch signal lines are different. In order to ensure the touch performance, the touch driving circuit is required to have a strong common voltage supplying capability, thereby causing an increase in power consumption. Further, since the touch electrodes of the touch display device are separated from each other, the common voltage of the touch electrodes must be supplied by the touch signal lines. The touch electrodes are highly dependent on the touch signals. When a certain touch signal line cannot be supplied or cannot be supplied sufficiently due to the process defect, the electrode block corresponding to the touch signal line may be poorly displayed due to a change in the pixel voltage difference, thereby causing deterioration in display quality.

To this end, the embodiments of the present disclosure provide a touch display substrate, a method for manufacturing the same, a driving method thereof, and a display device thereof, which overcome the defects of high power consumption and low display quality of the existing structure.

Embodiments of the present disclosure provide a touch display substrate. The touch display substrate includes a substrate, a plurality of electrode blocks, independently of each other and arranged in an array, disposed on the substrate, and a switching device disposed between the adjacent electrode blocks. The electrode block is configured to receive a common voltage during a display period and receive a touch scan signal during a touch period. The switching device is configured to electrically connect the adjacent electrode blocks during the display period and to electrically isolate the adjacent electrode blocks from each other during the touch period.

Figure 3:
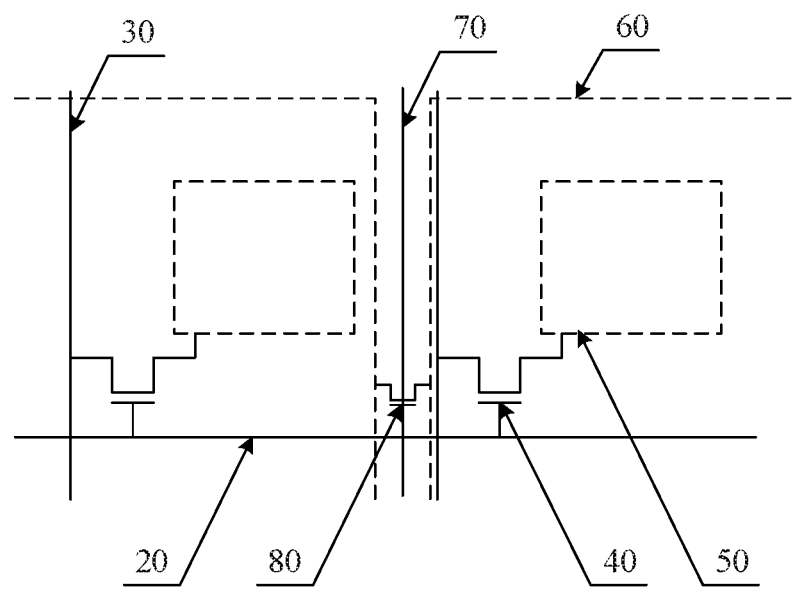
FIG. 3 is an equivalent circuit diagram of a touch display substrate according to an embodiment of the present disclosure.

FIG. 3 is an equivalent circuit diagram of a touch display substrate according to an embodiment of the present disclosure. As shown in FIG. 3, the structure of the self-capacitance in-cell touch display substrate provided by the embodiment of the present disclosure includes a gate line 20, a data line 30, a first thin film transistor 40, a pixel electrode 50, an electrode block 60, a signal line 70, and a switching device 80. As an example, the switching device 80 can be the second thin film transistor 80. The gate line 20 and the data line 30 vertically intersect to define a plurality of pixel units. The first thin film transistor 40 and the pixel electrode 50 are disposed within each of the pixel units. A plurality of electrode blocks 60 independent of each other and arranged in an array may be a rectangular pattern of 4*4 mm or 5*5 mm. Each of the electrode blocks 60 corresponds to a plurality of pixels. The switching device 80 (hereinafter also referred to as the second thin film transistor 80) is disposed between the adjacent electrode blocks 60. The signal lines 70 are disposed between the adjacent pixel units, and a part of the signal lines 70 are connected to the electrode blocks 60 as touch signal lines, and the other part of the signal lines 70 are dummy touch signal lines. The dummy touch signal lines disposed between the adjacent electrode blocks 60 serve as functional signal lines. The first thin film transistor 40 is used for loading a display signal from the data line 30 onto the pixel electrode 50 during the display period. The second thin film transistor 80 as the switching device is used for electrically connecting the adjacent electrode blocks 60 during the display period.

The self-capacitance in-cell touch display substrate provided by the embodiment of the present disclosure provides the switching device between the adjacent electrode blocks for conducting the respective electrode blocks during the display period, so that all electrode blocks of the touch display substrate are in a fully conductive state. This not only makes the common voltage supplying more uniformly, reduces the high requirement for the common voltage supplying capability of the touch driving circuit, reduces the power consumption, and also avoids the display defects caused by that the single touch signal line cannot be supplied with the common voltage or cannot be supplied with the common voltage sufficiently, thereby improving the display quality.

The technical solutions of the embodiments of the present disclosure are described in detail below through specific embodiments.

Figure 4:
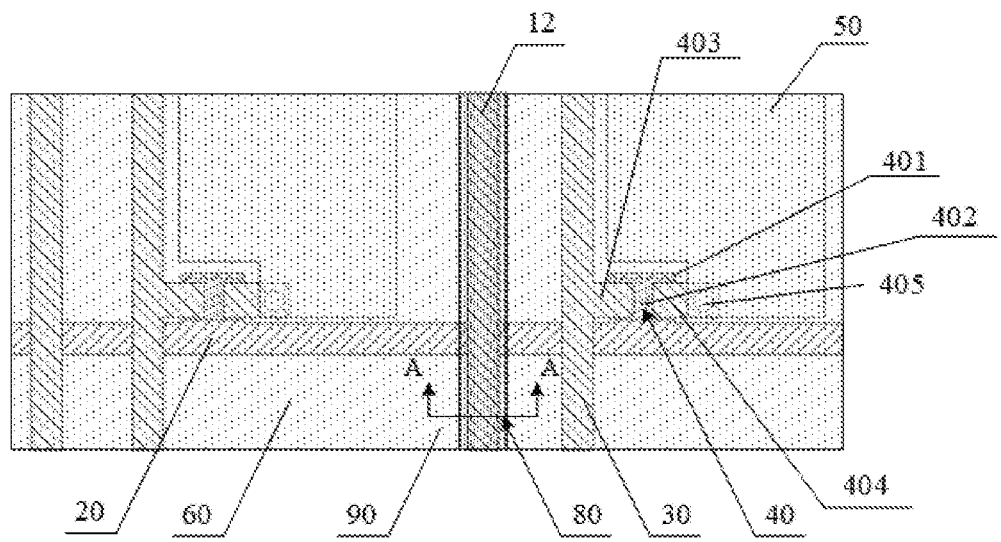
FIG. 4 is a plan structural schematic view of a touch display substrate according to an embodiment of the present disclosure.
Figure 5:
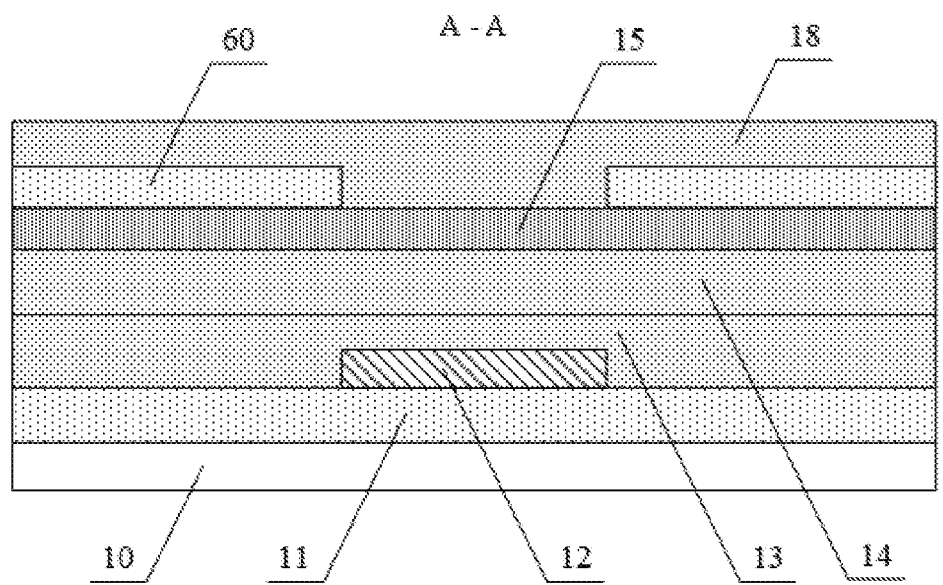
FIG. 5 is a structural schematic view taken along line A-A of FIG. 4.

FIG. 4 is a schematic plan view of a touch display substrate according to an embodiment of the present disclosure, and FIG. 5 is a cross-sectional view taken along line A-A of FIG. 4. As shown in FIG. 4, according to an embodiment of the present disclosure, the first thin film transistor 40 includes a first gate electrode 401 disposed on a substrate (not shown in FIG. 4), a gate insulating layer (not shown in FIG. 4) covering the first gate electrode 401, a first active layer 402 disposed on the gate insulating layer, a first source electrode 403, and a first drain electrode 404 disposed on the first active layer 402. The first gate electrode 401 is connected to the gate line 20. The first source electrode 403 and the first drain electrode 404 are disposed in the same layer as the data line 30. Here, "disposed in the same layer" means forming by the same film layer. The first source electrode 403 is connected to the data line 30. The first drain electrode 404 is disposed opposite to the first source electrode 403, and a region between the first drain electrode 404 and the first source electrode 403 forms a channel region. The first drain electrode 404 is connected to the pixel electrode 50 through a via 405 of a passivation layer (not shown in FIG. 4).

In one aspect, as described above, the switching device can include a transistor, such as the second thin film transistor. The second thin film transistor may include a functional signal line, an insulating layer, and an active layer which are sequentially disposed between the substrate and the electrode block. An orthographic projection of the functional signal line on the substrate at least covers an orthographic projection of the gap between the adjacent electrode blocks on the substrate. In addition, the functional signal line serves as the gate electrode of the second thin film transistor, and the insulating layer serves as the gate insulating layer of the second thin film transistor.

Specifically, as shown in FIG. 5, the second thin film transistor 80 includes a functional signal line 12 as the second gate electrode, a stack composed of a first passivation layer 13 and a second passivation layer 14 as the gate insulating layer (i.e., the insulating layer as described above), and a second active layer 15. An orthographic projection of the functional signal line 12 on the substrate 10 is between orthographic projections of the adjacent two electrode blocks on the substrate 10, and at least covers an orthographic projection of the gap between the adjacent two electrode blocks on the substrate 10.

Further, the second thin film transistor 80 further includes an insulating layer 11 disposed on the substrate 10, the first passivation layer 13 covering the functional signal line 12, and the second passivation layer 14 disposed on the first passivation layer 13. The functional signal line 12 is disposed on the insulating layer 11 and is in the same layer as the data line 30. The second active layer 15 is disposed on the second passivation layer 14. In addition, in the embodiment of the present disclosure, the electrode block 60 is covered with an alignment film layer 18.

It should be noted that, one of the two adjacent electrode blocks 60 serves as the second source electrode of the second thin film transistor, and the other serves as the second drain electrode of the second thin film transistor.

On the other hand, in the case where the electrode block includes a transparent conductive oxide, the second thin film transistor described above may further include a metal layer disposed between the active layer and the electrode block. The metal layer serves as a source/drain electrode of the second thin film transistor, which can contribute to improving the electrical connectivity between the electrode block and the active layer.

Figure 6:
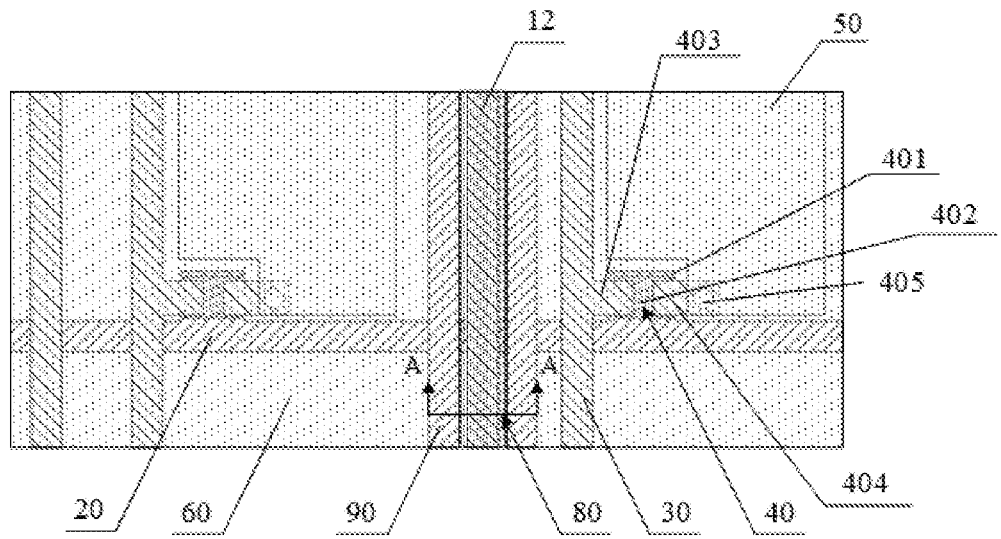
FIG. 6 is a plan structural schematic view of a touch display substrate according to an embodiment of the present disclosure.
Figure 7:
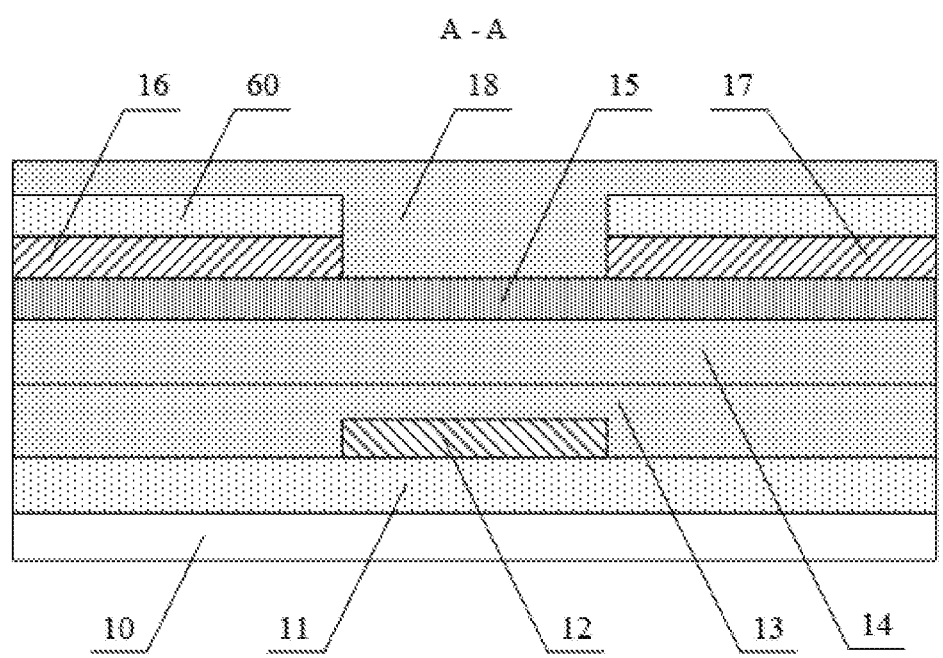
FIG. 7 is a structural schematic view taken along line A-A of FIG. 6.

Specifically, as shown in FIGS. 6 and 7, the second thin film transistor 80 may further include a metal layer 90 between the active layer 15 and the electrode block 60.

In an embodiment of the present disclosure, the metal layer 90 may include a first metal line 16 and a second metal line 17 spaced apart from each other. The first metal line 16 serves as the second source electrode. An orthographic projection of the first metal line 16 on the substrate 10 partially overlaps with an orthographic projection of one electrode block 60 of the adjacent two electrode blocks on the substrate 10. The second metal line 17 serves as the second drain electrode. An orthogonal projection of the second metal line 17 on the substrate 10 partially overlaps with an orthographic projection of the other electrode block 60 of the two adjacent electrode blocks on the substrate 10. Further, the first metal line 16 as the second source electrode and the second metal line 17 as the second drain electrode are disposed on the second active layer 15 with a channel region formed therebetween. The first metal line 16 and the second metal line 17 are connected to the adjacent electrode blocks 60, respectively.

It should be noted that, in this embodiment, other structures of the second thin film transistor 80 are as described above, and details are not described herein again.

Figure 8:
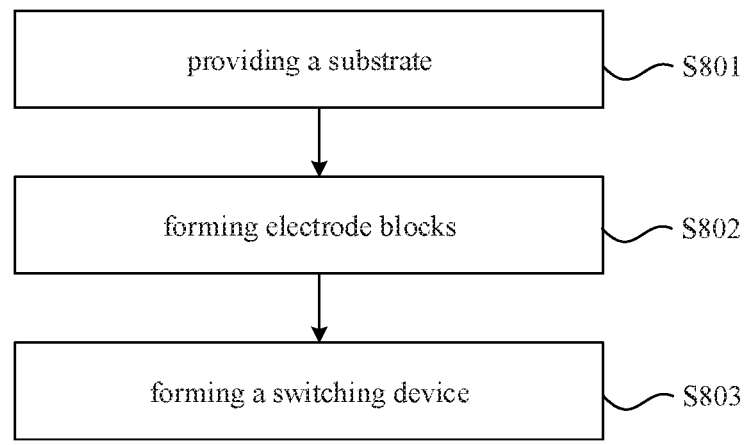
FIG. 8 is a flow chart of a method for manufacturing a touch display substrate according to an embodiment of the present disclosure.

Embodiments of the present disclosure also provide a method manufacturing the touch display substrate as described above. FIG. 8 is a flow chart of a method manufacturing a touch display substrate according to an embodiment of the present disclosure.

As shown in FIG. 8, the method includes: in S801, providing a substrate; in S802, forming a plurality of electrode blocks independently of each other and arranged in an array on the substrate; and in S803, forming a switching device between the adjacent electrode blocks on the substrate. The electrode block is configured to receive a common voltage during a display period and receive a touch scan signal during a touch period. The switching device is configured to electrically connect the adjacent electrode blocks during the display period and to electrically isolate the adjacent electrode blocks from each other during the touch period.

In an embodiment of the present disclosure, forming the switching device includes sequentially forming a functional signal line, an insulating layer, and an active layer on the substrate. Forming the electrode blocks includes forming the electrode blocks on the active layer. An orthographic projection of the functional signal line on the substrate at least covers an orthographic projection of a gap between the adjacent electrode blocks on the substrate.

Next, a process of a method for manufacturing the touch display substrate as described in FIGS. 4 and 5 will be described in detail.

Specifically, the manufacturing method will be described with reference to FIGS. 9 to 17.

It should be noted that, in the following, the "patterning process" involved in the embodiments of the present disclosure includes a processing of depositing a thin film, coating a photoresist, mask exposure, developing, etching, stripping photoresist, etc., which are existing and mature manufacturing process. In addition, the deposition may be carried out by a known process such as sputtering, evaporating, chemical vapor deposition, or the like. A known coating process may be employed for the coating. The etching may be carried out by a known method. The present disclosure is not specifically limited herein.

Figure 9:
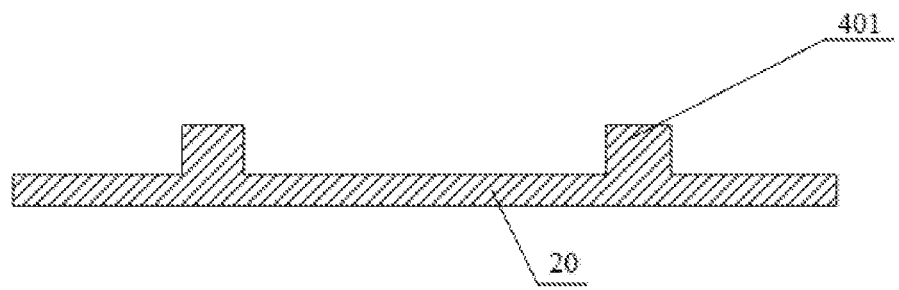
FIGS. 9 to 24 are schematic views of methods for manufacturing a touch display substrate according to an embodiment of the present disclosure.

Referring to FIG. 9, a first gate electrode and a gate line are formed on a substrate (not shown) by a patterning process. Specifically, forming the pattern of the first gate electrode and the gate line includes depositing a first metal thin film on the substrate, coating a photoresist on the first metal thin film, exposing and developing the photoresist by using a half-tone mask, to form an unexposed region at a position where the first gate electrode and the gate line are to be formed, in which the photoresist within the unexposed region is left, and to form a completely exposed region at other positions where the photoresist is removed, and etching the first metal thin film within the completely exposed region and stripping the remaining photoresist, to form a first gate electrode 401 and a gate line 20. Subsequently, a gate insulating layer (not shown) is deposited which covers the first gate electrode 401 and the gate line 20.

Figure 10:
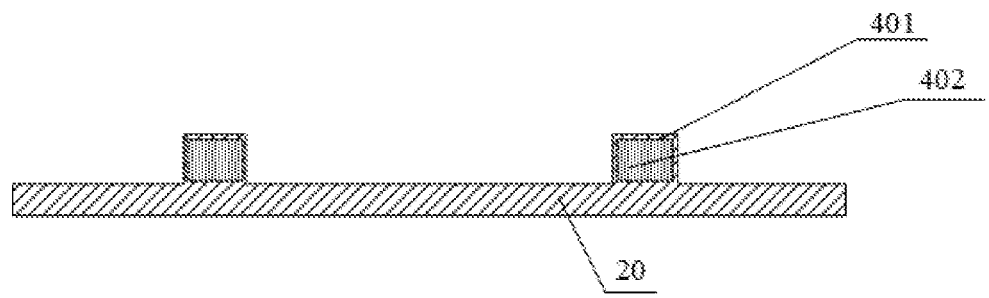

Referring to FIG. 10, on the substrate (not shown) on which the gate electrode 401 and the gate insulating layer (not shown) are formed, a first active layer is formed by a patterning process. Specifically, forming the first active layer includes depositing an active layer thin film on the gate insulating layer, coating a photoresist on the active layer thin film, exposing and developing the photoresist by using a half-tone mask, to form an unexposed region at a position where the first active layer is to be formed, in which the photoresist within the unexposed region is left, and to form a completely exposed region at other positions where the photoresist is removed, and etching the active layer thin film within the completely exposed region and stripping the remaining photoresist, to form a first active layer 402. The first active layer 402 is disposed on the first gate electrode 401.

Figure 11:
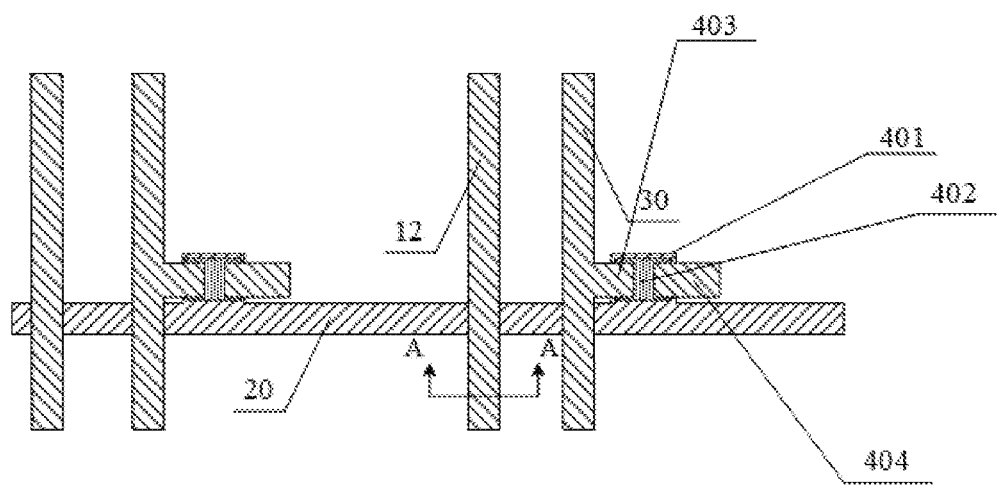
Figure 12:
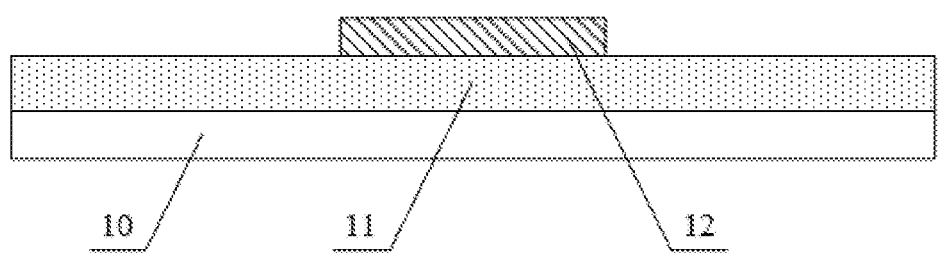

Referring to FIGS. 11 and 12, wherein FIG. 12 is a schematic view taken along line A-A of FIG. 11. A pattern of a data line, a functional signal line, a first source electrode, and a first drain electrode is formed by a patterning process on a substrate on which the foregoing pattern is formed. Specifically, forming the pattern of the data line, the functional signal line, the first source electrode, and the first drain electrode includes depositing a second metal thin film on the substrate on which the foregoing pattern is formed, coating a photoresist on the second metal thin film, exposing and developing the photoresist by using a half-tone mask, to form an unexposed region at a position where the pattern of the data line, the functional signal line, the first source electrode, and the first drain electrode is to be formed, in which the photoresist within the unexposed region is left, and to form a completely exposed region at other positions where the photoresist is removed, and etching the second metal thin film within the completely exposed region and stripping the remaining photoresist, to form a data line 30, a functional signal line 12, a first source electrode 403, and a first drain electrode 404. The first source electrode 403 is connected to the data line 30. The first drain electrode 404 is disposed opposite to the first source electrode 403 with a channel region formed therebetween. The channel region needs to be excessive etched. Further, the functional signal line 12 is disposed at a gap between adjacent pixel regions.

Figure 13:
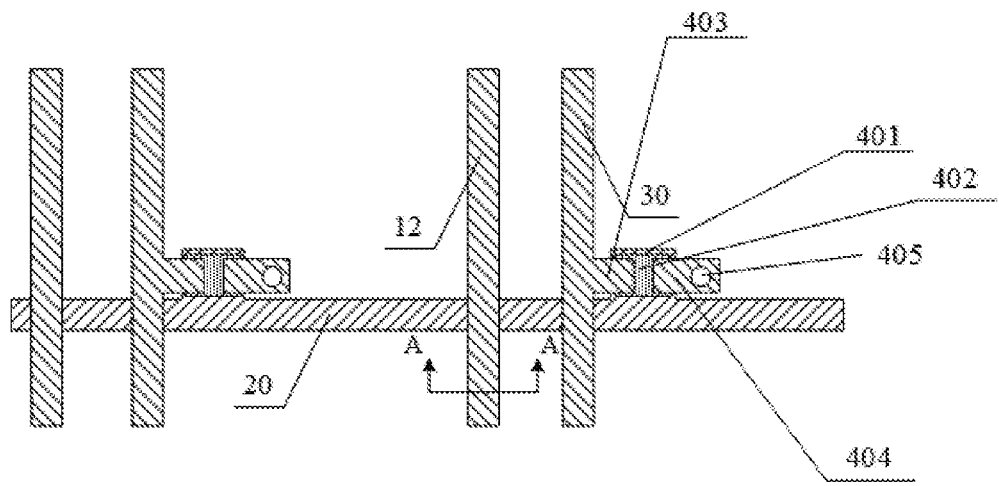
Figure 14:
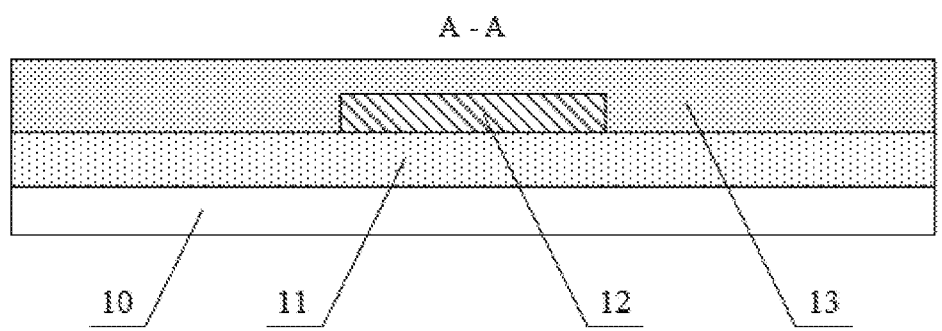

Referring to FIGS. 13 and 14, wherein FIG. 14 is a schematic view taken along line A-A of FIG. 13. A first passivation layer is formed by a patterning process on the substrate on which the foregoing pattern is formed. Specifically, forming the first passivation layer pattern includes depositing a passivation layer thin film on the substrate on which the foregoing pattern is formed, coating a photoresist on the passivation layer thin film, exposing and developing the photoresist by using a half-tone mask, to form a completely exposed region at a position where a via is to be formed, in which the photoresist within the completely exposed region is removed, and to form an unexposed region at other positions where the photoresist is left, and etching the passivation layer thin film within the completely exposed region and stripping the remaining photoresist, to form a first passivation layer 13 having the via 405. In addition, the via 405 is disposed on the first drain electrode 404 and exposes a surface of the first drain electrode 404.

Figure 15:
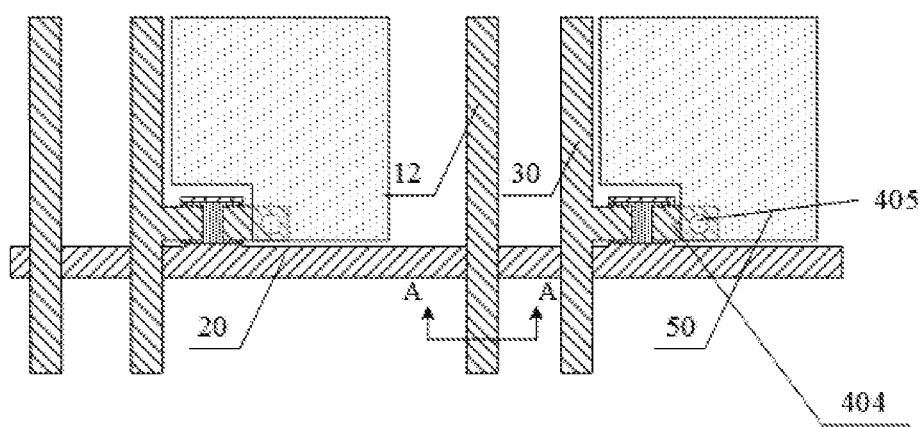
Figure 16:
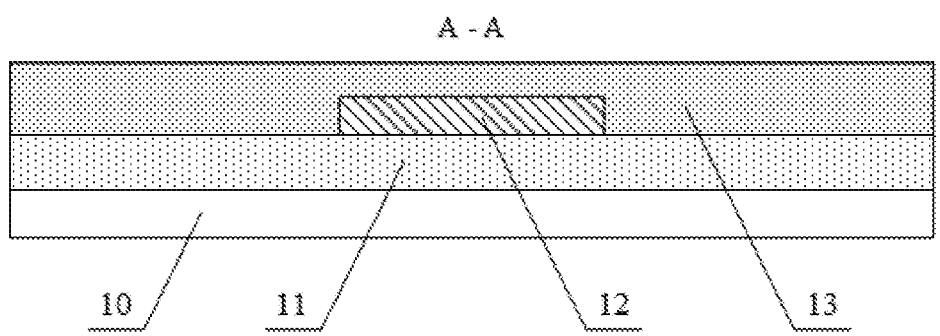

Referring to FIGS. 15 and 16, wherein FIG. 16 is a schematic view taken along line A-A of FIG. 15. A pixel electrode is formed by a patterning process on the substrate on which the foregoing pattern is formed. Forming the pixel electrode includes depositing a transparent conductive thin film on the substrate on which the foregoing pattern is formed, coating a photoresist on the transparent conductive thin film, exposing and developing the photoresist by using a half-tone mask, to form an unexposed region at a position where the pixel electrode is to be formed, in which the photoresist within the unexposed region is left, and to form a completely exposed region at other positions where the photoresist is removed, and etching the passivation layer thin film within the completely exposed region and stripping the remaining photoresist, to form a pixel electrode 50. Further, the pixel electrode 50 is disposed within the pixel region and connected to the first drain electrode 404 through the via 405.

Figure 17:
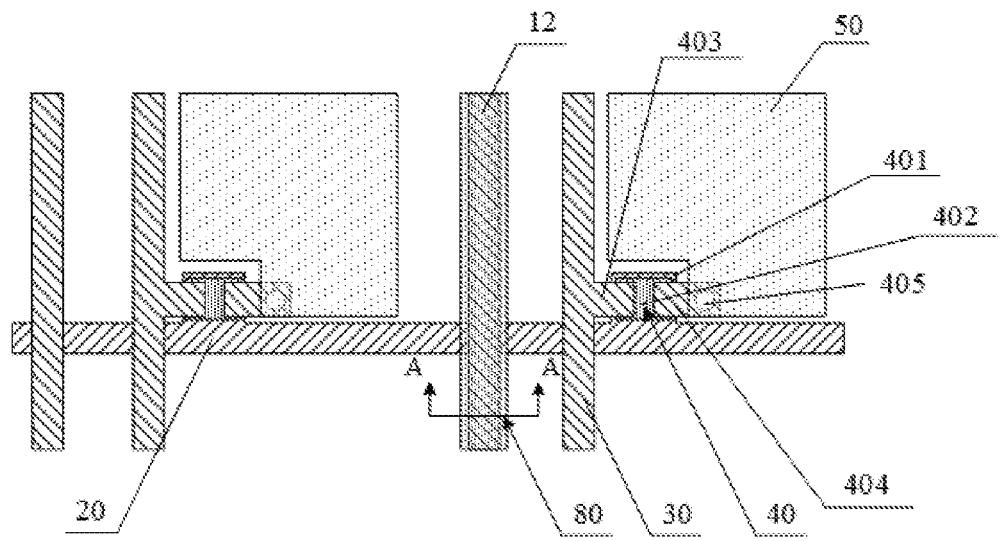
Figure 18:
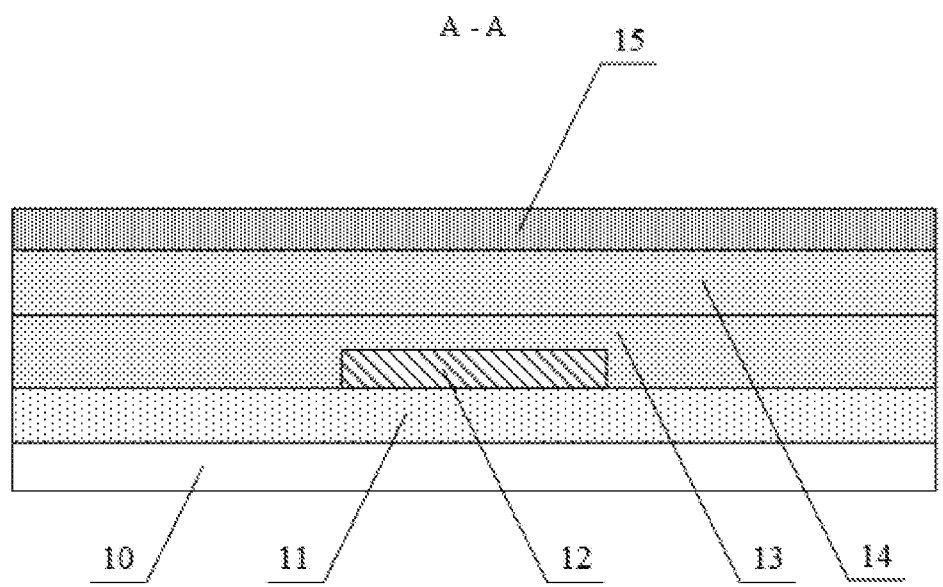

Referring to FIGS. 17 and 18, FIG. 18 is a schematic view taken along line A-A of FIG. 17. A second active layer is formed by a patterning process on the substrate on which the foregoing pattern is formed. Specifically, forming the second active layer includes sequentially depositing a passivation layer thin film and an active layer thin film on the substrate on which the foregoing pattern is formed, coating a photoresist on the active layer thin film, exposing and developing the photoresist by using a half-tone mask, to form an unexposed region at a position where second active layer is to be formed, in which the photoresist within the unexposed region is left, and to form a completely exposed region at other positions where the photoresist is removed, and etching the active layer thin film within the completely exposed region and stripping the remaining photoresist, to form a second passivation layer 14 and a second active layer 15.

Figure 19:
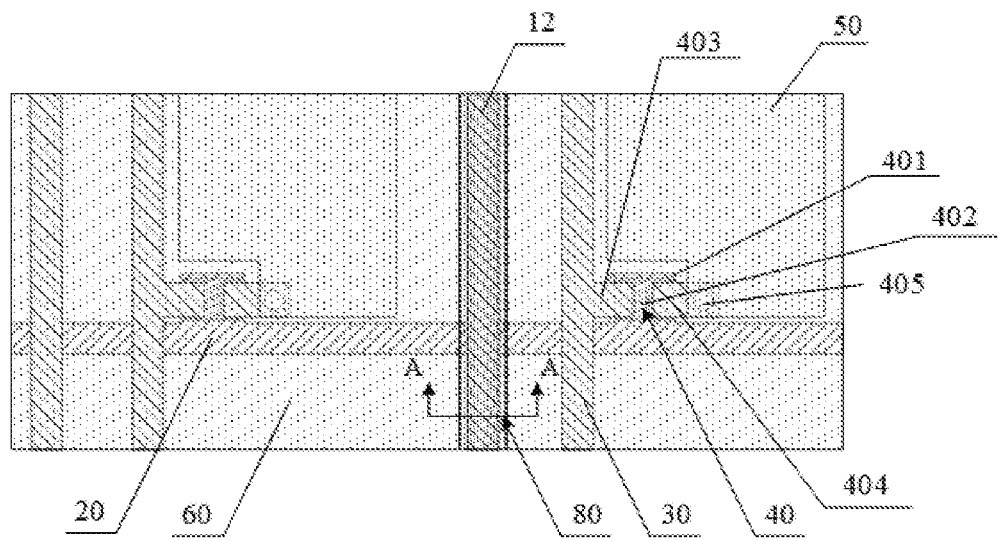
Figure 20:
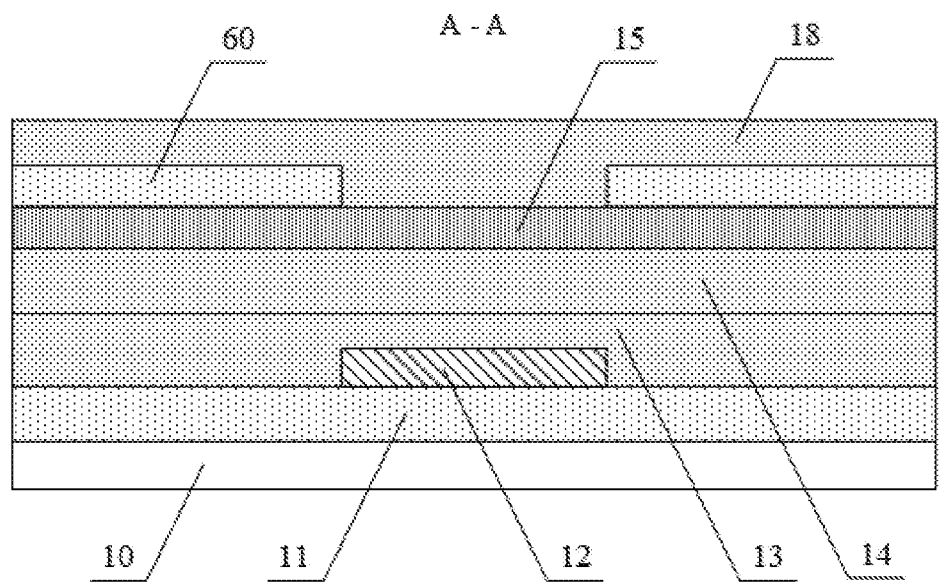

Referring to FIGS. 19 and 20, FIG. 20 is a schematic view taken along line A-A of FIG. 19. Electrode blocks are formed by a patterning process on the substrate on which the foregoing pattern is formed. Specifically, forming the electrode blocks includes depositing a transparent conductive thin film on the substrate on which the foregoing pattern is formed, coating a photoresist on the transparent conductive thin film, exposing and developing the photoresist by using a half-tone mask, to form an unexposed region at a position where the electrode blocks are to be formed, in which the photoresist within the unexposed region is left, and to form a completely exposed region at other positions where the photoresist is removed, and etching the transparent conductive thin film within the completely exposed region and stripping the remaining photoresist, to form electrode blocks 60. In two adjacent electrode blocks 60, an end of one electrode block 60 is arranged on one side of the second active layer 15, to serve as a second source electrode, and an end of the other electrode block 60 is arranged on the other side of the second active layer 15, to serve as a second drain electrode. A region between the two electrode blocks 60 forms a channel region. Finally, an alignment film layer 18 is deposited to cover the foregoing pattern and the entire substrate 10.

In an embodiment of the present disclosure, the substrate 10 may be a glass substrate or a quartz substrate. The first metal thin film, the second metal thin film, and the third metal thin film may be one or more of metals such as platinum (Pt), ruthenium (Ru), gold (Au), silver (Ag), molybdenum (Mo), chromium (Cr), aluminum (Al), tantalum (Ta), titanium (Ti), and tungsten (W), etc. The insulating layer, the first passivation layer, and the second passivation layer may be a composite thin film of silicon nitride (SiNx), silicon oxide (SiOx), or SiNx/SiOx. The material of the first active layer and the second active layer may be polysilicon to form a low temperature polysilicon (LTPS) thin film transistor, or may be a metal oxide to form an oxide thin film transistor. A material of the metal oxide may be indium gallium zinc oxide (IGZO) or indium tin zinc oxide (ITZO). A material of the transparent conductive thin film may be indium tin oxide (ITO) or indium zinc oxide (IZO).

As can be seen from the process of manufacturing the touch display substrate shown in FIGS. 9 to 20, in this embodiment, the functional signal line, the second active layer, and the electrode blocks form the second thin film transistor. The second thin film transistor is used for conducting the respective electrode blocks during the display period, so that all electrode blocks of the touch display substrate are in a fully conductive state. This not only makes the common voltage supplying more uniformly, reduces the high requirement for the common voltage supplying capability of the touch driving circuit, reduces the power consumption, and also avoids the display defects caused by that the single touch signal line cannot be supplied with the common voltage or cannot be supplied with the common voltage sufficiently, thereby improving the display quality.

It should be noted that, in this embodiment, the structure of the first thin film transistor is described by taking the bottom gate structure as an example. However, in the actual implementation, the first thin film transistor may also adopt a top gate structure, which is not specifically limited in this embodiment.

In summary, as shown in FIGS. 19 and 20 (i.e., FIGS. 4 and 5), the touch display substrate of the present embodiment includes a substrate 10, a gate line 20 and a first gate electrode 401 disposed on the substrate 10, the gate electrode being connected to the gate line 20, a gate insulating layer covering the gate line 20 and the first gate electrode 401, a first active layer 402 disposed on the gate insulating layer, a data line 30 and a function signal line 12 disposed on the gate insulating layer, and a first source electrode 403 and a first drain electrode 404 disposed on the first active layer 402. The first source electrode 403 is connected to the data line 30. The first drain electrode 404 is disposed opposite to the first source electrode 403, and a channel region is formed therebetween. The functional signal line 12 as a second gate electrode is disposed in the same layer as the data line 30 and disposed between adjacent electrode blocks 60. An orthographic projection of the functional signal line 12 on the substrate 10 at least covers an orthographic projection of a gap between the adjacent two electrode blocks 60 on the substrate 10. The touch display substrate further includes a first passivation layer 13 covering the data line 30, the functional signal line 12, the first source electrode 403 and the first drain electrode 404, the first passivation layer 13 having a via 405 at a position corresponding to the first drain electrode 404, a pixel electrode 50 disposed on the first passivation layer 13, the pixel electrode 50 being connected to the first drain electrode 404 through the via 405, a second passivation layer 14 covering the pixel electrode 50, a second active layer 15 disposed on the second passivation layer 14, the second active layer 15 being disposed above the functional signal line 12 as the second gate electrode, a plurality of electrode blocks 60 independently of each other and arranged in an array, in which among the adjacent electrode blocks 60, an end of one electrode block 60 is arranged on one side of the second active layer 15, an end of the other electrode block 60 is arranged on the other side of the second active layer 15, and a region between the two electrode blocks 60 forms a channel region, and an alignment film layer 18 covering the above pattern.

On the other hand, further, forming the switching device further includes forming a metal layer on the active layer. The metal layer includes a first metal line and a second metal line spaced apart from each other. Orthographic projections of the first metal line and the second metal line on the substrate respectively overlap with the orthographic projection portions of the adjacent electrode blocks on the substrate.

Different from the above embodiments, the touch display substrate of the embodiment further has a metal layer disposed between the second active layer and the electrode block.

Specifically, a method for forming a metal layer will be described with reference to FIGS. 21 and 22. It is to be noted that FIGS. 21 and 22 show a method for forming a metal layer on the basis of FIGS. 15 and 16.

Figure 21:
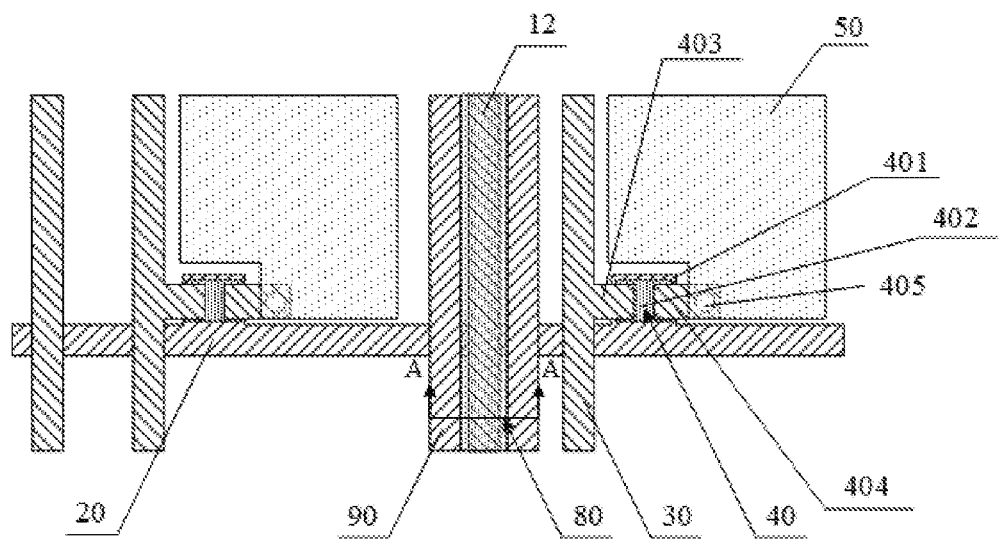
Figure 22:
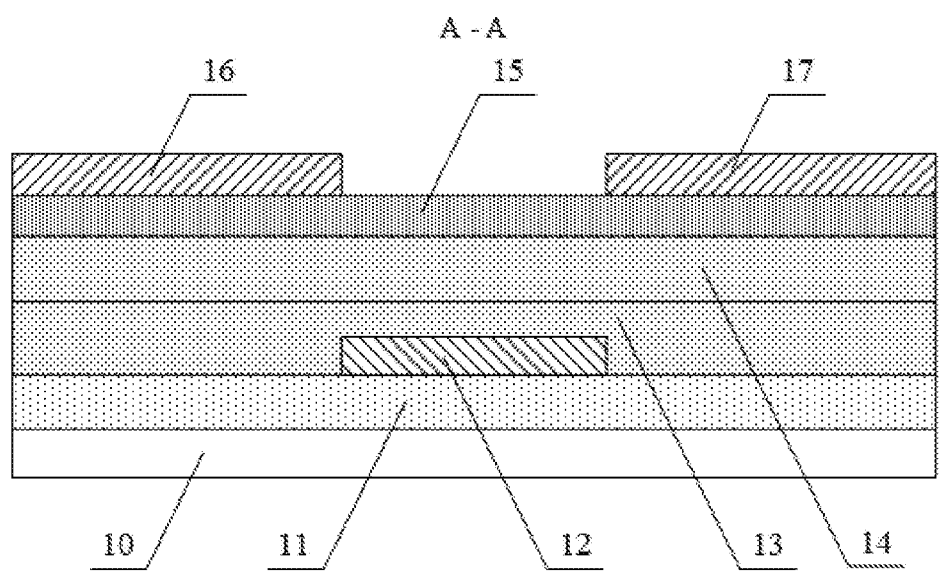

As shown in FIGS. 21 and 22, a pattern of the second active layer and the metal layer are formed by a patterning process on the substrate on which the foregoing pattern is formed. Specifically, forming the second active layer and the metal line includes sequentially depositing a passivation layer thin film, an active layer thin film, and a third metal thin film on the substrate on which the foregoing pattern is formed, coating a photoresist on the third metal thin film, exposing and developing the photoresist by using a half-tone mask or a gray tone mask, to form an unexposed region at a position where the metal line is to be formed to have a photoresist having a first thickness, to form a partially exposed region at a position where a source layer channel is to be formed to have a photoresist having a second thickness, and to form a completely exposed region at the remaining positions without a photoresist, wherein the first thickness is greater than the second thickness, etching away the third metal thin film and the active layer thin film within the completely exposed region by a first etching process, and performing ashing process to photoresist, to remove the photoresist having the second thickness, so as to expose the third metal thin film within the partially exposed region, etching away the third metal thin film within the partially exposed region by a second etching process, and the remaining photoresist is stripped off, thereby forming the second passivation layer 14, the second active layer 15, and the metal layer 90. The second active layer 15 is disposed on the second passivation layer 14 and disposed at a gap between adjacent two pixel regions.

In addition, the metal layer 90 includes a first metal line 16 as the second source electrode of the second thin film transistor 80 and a second metal line 17 as the second drain electrode of the second thin film transistor 80. The first metal line 16 and the second metal line 17 are disposed on the second active layer 15, and a region therebetween forms a channel region. It should be noted that the etching process for forming the channel region of the second thin film transistor is similar to the etching process for forming the channel region of the first thin film transistor. That is, the active layer needs to be excessive etched.

Figure 23:
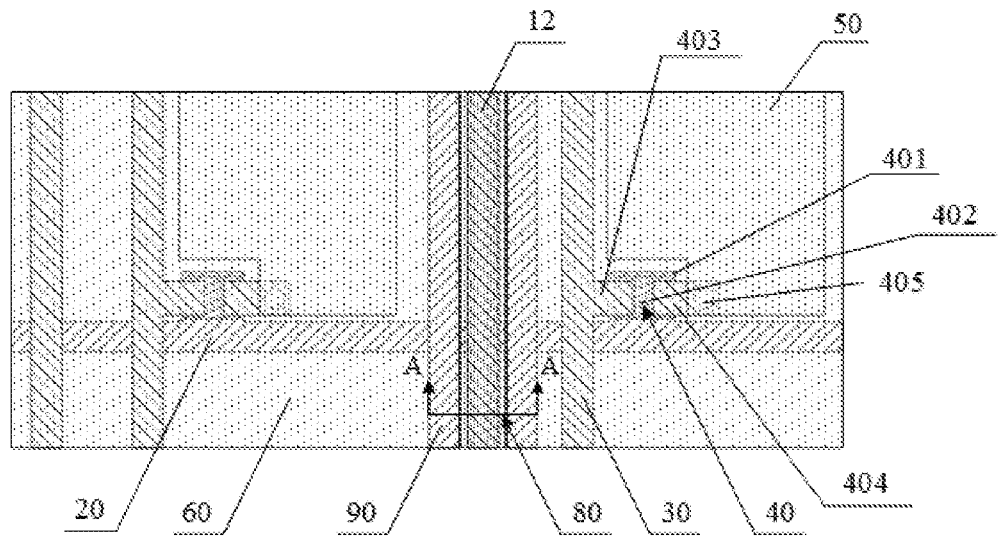
Figure 24:
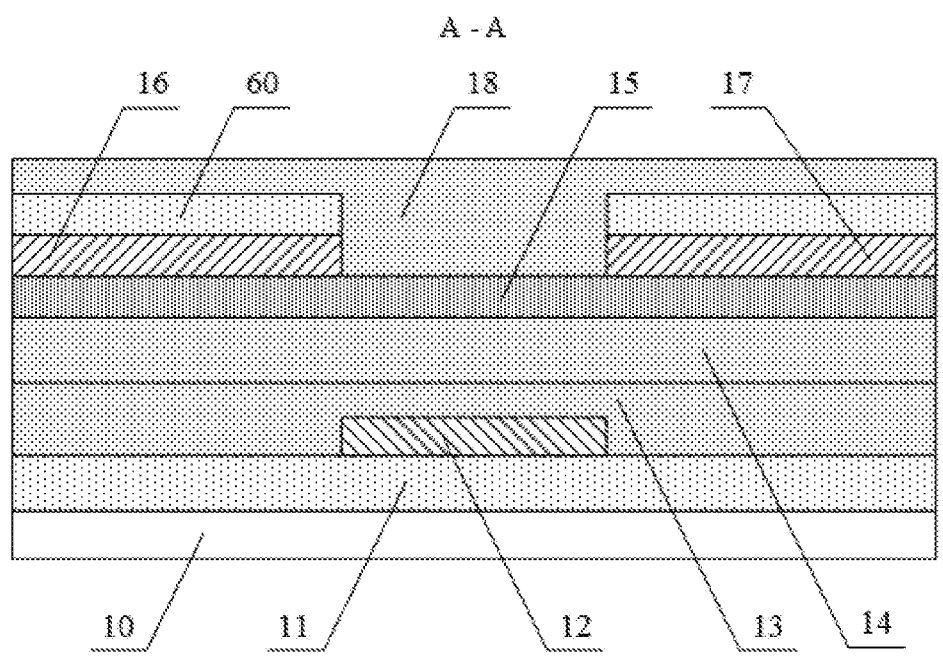

Referring to FIGS. 23 and 24, electrode blocks are formed by a patterning process on the substrate on which the foregoing pattern is formed. Specifically, forming the electrode blocks includes depositing a transparent conductive thin film on the substrate 10 on which the foregoing pattern is formed, coating a photoresist on the transparent conductive thin film, exposing and developing the photoresist using a half-tone mask, to form an unexposed region at a position where the electrode blocks are to be formed, in which the photoresist within the unexposed region is left, and to form a completely exposed region at the remaining positions where the photoresist is removed, etching the transparent conductive thin film within the completely exposed region and stripping the remaining photoresist, to form the electrode blocks 60. Among the adjacent electrode blocks 60, an end of one electrode block 60 is arranged on the second source electrode 16 to form a connection with the second source electrode 16, and an end of the other electrode block 60 is arranged on the second drain electrode 17 to form a connection with the second drain electrode 17. Finally, the alignment film layer 18 is deposited to cover the foregoing pattern and the entire substrate 10.

During the formation of the electrode blocks 60, an orthographic projection of the functional signal line 12 on the substrate 10 is disposed between orthographic projections of the adjacent two electrode blocks 60 on the substrate 10, and at least covers an orthographic projection of a gap between the adjacent two electrode blocks 60 on the substrate 10. An orthographic projection of the first metal line 16 on the substrate 10 partially overlaps with an orthographic projection of one electrode block 60 of the adjacent two electrode blocks 60 on the substrate 10. An orthographic projection of the second metal line 17 on the substrate 10 partially overlaps with an orthographic projection of the other electrode block 60 of the adjacent two electrode blocks 60 on the substrate 10.

It can be seen from the process of manufacturing the touch display substrate as described above that, in this embodiment, the functional signal line, the second active layer, and the metal layer form the second thin film transistor. The second thin film transistor is used for conducting the respective electrode blocks during the display period, so that all electrode blocks of the touch display substrate are in a fully conductive state. This not only makes the common voltage supplying more uniformly, reduces the high requirement for the common voltage supplying capability of the touch driving circuit, reduces the power consumption, and also avoids the display defects caused by that the single touch signal line cannot be supplied with the common voltage or cannot be supplied with the common voltage sufficiently, thereby improving the display quality.

It should be noted that, in this embodiment, the process of manufacturing the touch display substrate is described by taking a patterning process as an example. However, in actual implementation, the touch display substrate of the embodiment can employ less patterning process. For example, the foregoing method for forming the active layer and forming the first source electrode and the first drain electrode may be formed by a one-time patterning process using a half-tone mask or a gray mask technique, which is not specifically limited herein. In this embodiment, the structure of the first thin film transistor is described by taking the bottom gate structure as an example. However, in the actual implementation, the first thin film transistor may also adopt a top gate structure, which is not specifically limited in this embodiment.

In summary, as shown in FIGS. 23 and 24 (i.e., FIGS. 6 and 7), the touch display substrate of the present embodiment includes a substrate 10, a gate line 20 and a first gate electrode 401 disposed on the substrate 10, the gate electrode being connected to the gate line 20, a gate insulating layer covering the gate line 20 and the first gate electrode 401, a first active layer 402 disposed on the gate insulating layer, a data line 30 and a function signal line 12 disposed on the gate insulating layer, and a first source electrode 403 and a first drain electrode 404 disposed on the first active layer 402. The first source electrode 403 is connected to the data line 30. The first drain electrode 404 is disposed opposite to the first source electrode 403, and a channel region is formed therebetween. The functional signal line 12 as a second gate electrode is disposed in the same layer as the data line 30 and disposed between adjacent electrode blocks 60. An orthographic projection of the functional signal line 12 on the substrate 10 at least covers an orthographic projection of a gap between the adjacent two electrode blocks 60 on the substrate 10. The touch display substrate further includes a first passivation layer 13 covering the data line 30, the functional signal line 12, the first source electrode 403 and the first drain electrode 404, the first passivation layer 13 having a via 405 at a position corresponding to the first drain electrode 404, a pixel electrode 50 disposed on the first passivation layer 13, the pixel electrode 50 being connected to the first drain electrode 404 through the via 405, a second passivation layer 14 covering the pixel electrode 50, a second active layer 15 disposed on the second passivation layer 14, the second active layer 15 being disposed above the functional signal line 12 as the second gate electrode, a first metal line 16 and a second metal line 17 disposed on the second active layer 15, the two metal lines respectively serving as the second source electrode 16 and the second drain electrode 17, in which a region between the second source electrode 16 and the second drain electrode 17 forms a channel region, a plurality of electrode blocks 60 independently of each other and arranged in an array, in which among the adjacent electrode blocks 60, an end of one electrode block 60 is arranged on the first metal line 16 to form a connection with the second source electrode 16, and an end of the other electrode block 60 is arranged on the second metal line 17 to form a connection with the second drain electrode 17, and an alignment film layer 18 covering the above pattern.

It should be noted that, the functional signal lines are in the same layer as the data lines and are simultaneously formed in one-time patterning process.

A touch display device is also provided in an embodiment of the present disclosure. The touch display device includes the touch display substrate according to the above embodiment. The touch display device can be any product or component having a display function, such as a mobile phone, a tablet computer, a television, a display, a notebook computer, a digital photo frame, a navigator, and the like.

An embodiment of the present disclosure further provides a driving method for the above touch display substrate. The driving method includes during the touch period, the electrode block 60 receives a touch scan signal, during the display period, the electrode block 60 receives a common voltage. The switching device (i.e., the second thin film transistor 80) electrically isolates adjacent electrode blocks 60 from each other during the touch period and electrically connects the adjacent electrode blocks 60 during the display period. In an embodiment of the present disclosure, as described above, the touch display substrate further includes a touch signal line coupled to the electrode block 60. During the touch period, the touch signal line provides the touch scan signal to the electrode block 60, and during the display period, the touch signal line provides the common voltage to the electrode block 60.

Further, in an embodiment of the present disclosure, the touch display substrate further includes a dummy touch signal line disposed in the same layer as and in parallel with the touch signal line. The dummy touch signal line disposed between the adjacent electrode blocks serves as the functional signal line 12. During the touch period, the functional signal line 12 provides a low voltage, and the switching device 80 is turned off, and during the display period, the functional signal line 12 provides a high voltage, and the switching device 80 is turned on to electrically connect the adjacent electrode blocks 60.

Specifically, when the touch display substrate of the embodiment of the present disclosure is applied, a low voltage is supplied to the functional signal line 12 during the touch (touch time) period, and the second thin film transistor 80 is turned off and the electrode blocks 60 are normally operated. During the display (display time) period, a high voltage is supplied to the functional signal line 12, and the second thin film transistor 80 is turned on to electrically connect the adjacent electrode blocks 60, in which the adjacent electrode blocks 60 are respectively connected to the second source electrode 16 and the second drain electrode 17. In turn, all the electrode blocks 60 of the touch display substrate are in a fully conductive state. At this time, the common voltage on all the electrode blocks 60 is more uniform, which not only reduces the high requirement for the common voltage supplying capability of the touch driving circuit and reduces the power consumption, but also avoids the display defects due to the single touch signal line cannot be supplied with the common voltage or cannot be supplied with the common voltage sufficiently, thereby improving the display quality.

The embodiments disclosed in the present disclosure are as described above, but the content described above are merely used to facilitate the understanding of the present disclosure, and are not intended to limit the present disclosure. Any modification and variation in the form and details of the implementation may be made by those skilled in the art without departing from the spirit and scope of the disclosure. The scope of the present disclosure is to be determined by the scope of the appended claims.

What is claimed is:

1. A touch display substrate comprising:
    a substrate;
    a plurality of electrode blocks, independent of each other and arranged in an array, disposed on the substrate; and
    a switching device disposed between adjacent electrode blocks of the plurality of electrode blocks,
    wherein each electrode block is configured to receive a common voltage during a display period and receive a touch scan signal during a touch period, and wherein the switching device is configured to electrically connect the adjacent electrode blocks during the display period and electrically isolate the adjacent electrode blocks from each other during the touch period,
    wherein the switching device comprises a transistor,
    wherein the transistor comprises a functional signal line, an insulating layer, and an active layer which are sequentially disposed between the substrate and each electrode block, and
    wherein an orthographic projection of the functional signal line on the substrate at least covers an orthographic projection of a gap between the adjacent electrode blocks on the substrate, wherein the functional signal line serves as a gate electrode of the transistor, and wherein the insulating layer serves as a gate insulating layer of the transistor.

2. The touch display substrate according to claim 1, wherein each electrode block comprises a transparent conductive oxide, and
    wherein the transistor further comprises a metal layer disposed between the active layer and each electrode block.

3. The touch display substrate according to claim 2, wherein the metal layer comprises a first metal line and a second metal line spaced apart from each other, wherein an orthographic projection of the first metal line on the substrate and an orthographic projection of the second metal line on the substrate respectively partially overlap with orthographic projections of the adjacent electrode blocks on the substrate.

4. The touch display substrate according to claim 3, further comprising a gate line and a data line disposed in form of intersection, wherein the functional signal line is disposed in the same layer as the data line.

5. The touch display substrate according to claim 3, further comprising:
    a touch signal line coupled to each electrode block; and
    a dummy touch signal line disposed in the same layer as and in parallel with the touch signal line, wherein the functional signal line comprises the dummy touch signal line.

6. A touch display device comprising the touch display substrate according to claim 3.

7. The touch display substrate according to claim 2, further comprising a gate line and a data line disposed in form of intersection, wherein the functional signal line is disposed in the same layer as the data line.

8. The touch display substrate according to claim 2, further comprising:
    a touch signal line coupled to each electrode block; and
    a dummy touch signal line disposed in the same layer as and in parallel with the touch signal line, wherein the functional signal line comprises the dummy touch signal line.

9. A touch display device comprising the touch display substrate according to claim 2.

10. The touch display substrate according to claim 1, further comprising a gate line and a data line disposed in form of intersection, wherein the functional signal line is disposed in the same layer as the data line.

11. The touch display substrate according to claim 1, further comprising:
    a touch signal line coupled to each electrode block; and
    a dummy touch signal line disposed in the same layer as and in parallel with the touch signal line, wherein the functional signal line comprises the dummy touch signal line.

12. A method for manufacturing the touch display substrate according to claim 1, the method comprising:
    providing the substrate;
    forming the plurality of electrode blocks independently of each other and arranged in the array on the substrate; and
    forming the switching device between the adjacent electrode blocks on the substrate.

13. The method according to claim 12, wherein forming the switching device comprises sequentially forming a functional signal line, an insulating layer, and an active layer on the substrate,
    wherein forming each electrode block comprises forming the electrode block on the active layer, and
    wherein an orthographic projection of the functional signal line on the substrate at least covers an orthographic projection of a gap between the adjacent electrode blocks on the substrate.

14. The method according to claim 13, wherein forming the switching device further comprises forming a metal layer on the active layer, wherein the metal layer comprises a first metal line and a second metal line spaced apart from each other, and wherein an orthographic projection of the first metal line on the substrate and an orthographic projection of the second metal line on the substrate respectively partially overlap with orthographic projections of the adjacent electrode blocks on the substrate.

15. A touch display device comprising the touch display substrate according to claim 1.

16. A driving method for a touch display substrate, wherein the touch display substrate comprises a substrate, a plurality of electrode blocks, independent of each other and arranged in an array, disposed on the substrate, and a switching device disposed between adjacent electrode blocks of the plurality of electrode blocks, the driving method comprising:
- during a touch period, each electrode block receiving a touch scan signal;
- during a display period, each electrode block receiving a common voltage, wherein the switching device electrically isolates the adjacent electrode blocks from each other during the touch period and electrically connects the adjacent electrode blocks during the display period,
- wherein the switching device comprises a transistor,
- wherein the transistor comprises a functional signal line, an insulating layer, and an active layer which are sequentially disposed between the substrate and each electrode block, and
- wherein an orthographic projection of the functional signal line on the substrate at least covers an orthographic projection of a gap between the adjacent electrode blocks on the substrate, wherein the functional signal line serves as a gate electrode of the transistor, and wherein the insulating layer serves as a gate insulating layer of the transistor.

17. The driving method according to claim 16, wherein the touch display substrate further comprises a touch signal line coupled to each electrode block,
- wherein during the touch period, the touch signal line provides a touch scan signal to each electrode block, and
- wherein during the display period, the touch signal line provides a common voltage to each electrode block.

18. The driving method according to claim 17, wherein the touch display substrate further comprises a dummy touch signal line disposed in the same layer as and in parallel with the touch signal line, and wherein the functional signal line comprises the dummy touch signal line,
- wherein, during the touch period, the functional signal line provides a low voltage and the switching device is turned off, and
- wherein during the display period, the functional signal line provides a high voltage and the switching device is turned on, so as to electrically connect the adjacent electrode blocks.

* * * * *